(12) United States Patent
Selvakani et al.

(10) Patent No.: US 11,599,106 B2
(45) Date of Patent: Mar. 7, 2023

(54) CONTAINER MONITORING AND CONTROL BY UNMANNED AERIAL VEHICLE

(71) Applicant: CARRIER CORPORATION, Palm Beach Gardens, FL (US)

(72) Inventors: Kanna Selvakani, Hyderabad (IN); Srinivasa Reddy Pilli, Hyderabad (IN); Kiran Kumar Kollapudi, Hyderabad (IN)

(73) Assignee: Carrier Corporation, Palm Beach Gardens, FL (US)

( * ) Notice: Subject to any disclaimer, the term of this patent is extended or adjusted under 35 U.S.C. 154(b) by 437 days.

(21) Appl. No.: 16/716,742

(22) Filed: Dec. 17, 2019

(65) Prior Publication Data

US 2020/0241522 A1 Jul. 30, 2020

(30) Foreign Application Priority Data

Jan. 25, 2019 (IN) .............................. 201911003129

(51) Int. Cl.
*G05D 1/00* (2006.01)
*H04W 76/10* (2018.01)
*H04L 67/00* (2022.01)
*H04W 12/06* (2021.01)
*H04N 5/225* (2006.01)
(Continued)

(52) U.S. Cl.
CPC .......... *G05D 1/0011* (2013.01); *B64C 39/024* (2013.01); *G01K 13/02* (2013.01); *G05D 1/101* (2013.01); *G06F 8/65* (2013.01); *G10L 25/51* (2013.01); *H04L 67/34* (2013.01); *H04N 5/2253* (2013.01); *H04R 1/028* (2013.01); *H04R 1/08* (2013.01); *H04W 12/06* (2013.01); *H04W 76/10* (2018.02); *H04R 2499/13* (2013.01)

(58) Field of Classification Search
CPC ........ H04W 4/38; H04W 12/06; G01K 13/02; G01K 1/026; G01K 1/024; G64C 39/024; G64C 2201/127; G64C 2201/126; G64C 2201/146; G64C 2201/27; G05D 1/0011; G05D 1/101; G05D 1/0038; H04R 2499/13
USPC ........................................................... 701/2
See application file for complete search history.

(56) References Cited

U.S. PATENT DOCUMENTS 6,962,946 B2 11/2005 Brady et al.
9,023,410 B2 5/2015 Szydlowski et al.
(Continued)

FOREIGN PATENT DOCUMENTS

CN 205750464 11/2016
CN 106973365 A 7/2017
(Continued)

OTHER PUBLICATIONS

European Search Report for European Application No. 20153208.2 dated Apr. 29, 2020.
(Continued)

*Primary Examiner* — Melur Ramakrishnaiah
(74) *Attorney, Agent, or Firm* — Carlson, Gaskey & Olds, P.C.

(57) ABSTRACT

A system includes a plurality of containers and a plurality of controllers. Each of the controllers are associated with a respective one of the plurality of containers. An unmanned aerial vehicle is configured for wireless communication with the plurality of controllers.

17 Claims, 4 Drawing Sheets

(51) Int. Cl.

| | |
|---|---|
| *H04R 1/08* | (2006.01) |
| *H04R 1/02* | (2006.01) |
| *G05D 1/10* | (2006.01) |
| *B64C 39/02* | (2023.01) |
| *G01K 13/02* | (2021.01) |
| *G06F 8/65* | (2018.01) |
| *G10L 25/51* | (2013.01) |

(56) References Cited

U.S. PATENT DOCUMENTS

| | | |
|---|---|---|
| 9,033,116 B2 | 5/2015 | Breed |
| 9,747,808 B2 | 8/2017 | Chambers et al. |
| 9,910,432 B1 | 3/2018 | Chambers et al. |
| 9,997,080 B1 | 6/2018 | Chambers et al. |
| 10,029,788 B2 | 7/2018 | Abeles et al. |
| 10,039,401 B1 | 8/2018 | Romanucci |
| 10,134,007 B2 | 11/2018 | Gollu |
| 10,207,804 B1 | 2/2019 | Gentry |
| 10,764,763 B2 * | 9/2020 | Byrne .................... G08B 25/14 |
| 2011/0221573 A1 * | 9/2011 | Huat ..................... G05B 15/02 340/10.1 |
| 2016/0318609 A1 | 11/2016 | Lynn et al. |
| 2017/0023394 A1 | 1/2017 | Akbar |
| 2017/0177925 A1 * | 6/2017 | Volkart ................. G06V 20/13 |
| 2017/0337337 A1 | 11/2017 | Heckerman et al. |
| 2018/0040402 A1 | 2/2018 | Eguchi et al. |
| 2018/0048987 A1 * | 2/2018 | Morris ................. H04B 5/0031 |
| 2018/0089622 A1 * | 3/2018 | Burch, V ............... B64D 47/08 |
| 2018/0096294 A1 | 4/2018 | Winkle et al. |
| 2018/0144298 A1 | 5/2018 | Rankin |
| 2018/0236278 A1 | 8/2018 | Smith et al. |
| 2018/0236840 A1 | 8/2018 | Cantrell et al. |
| 2018/0293896 A1 * | 10/2018 | Dow ...................... G08G 5/003 |
| 2018/0347895 A1 | 12/2018 | Jonsson et al. |
| 2018/0359021 A1 | 12/2018 | Westrup et al. |
| 2020/0113166 A1 * | 4/2020 | Warren, Jr. ............ G05D 1/101 |
| 2020/0126413 A1 * | 4/2020 | Sham .................... B64C 39/024 |
| 2021/0252949 A1 * | 8/2021 | Zarrabi .................... H02J 7/007 |

FOREIGN PATENT DOCUMENTS

| | | | |
|---|---|---|---|
| CN | 107272686 | 10/2017 | |
| CN | 107403294 | 11/2017 | |
| CN | 107963198 | 4/2018 | |
| CN | 207697983 | 8/2018 | |
| EP | 3257168 | 10/2018 | |
| JP | 6412657 | 10/2018 | |
| WO | 2016154551 | 9/2016 | |
| WO | WO-2017105983 A1 * | 6/2017 | ............ F25D 11/003 |
| WO | 2018000986 | 1/2018 | |
| WO | 2018022722 | 2/2018 | |
| WO | 2018045378 | 3/2018 | |
| WO | 2018057821 | 3/2018 | |
| WO | 2018195093 | 10/2018 | |
| WO | 2018222411 A1 | 12/2018 | |
| WO | WO-2018222411 A1 * | 12/2018 | ........... B64C 39/024 |

OTHER PUBLICATIONS

Singapore Search Report for Singapore Patent Application No. 10201913003W dated Jun. 23, 2020.

* cited by examiner

CONTAINER MONITORING AND CONTROL BY UNMANNED AERIAL VEHICLE

BACKGROUND

Intermodal shipping containers are in widespread use for transporting a variety of items. An advantage of such containers is that they can be used by different carriers without unloading the contents of the container. For example, the same container can be loaded, placed onto a truck, carried to a shipping port, removed from the truck and placed onto a ship that carries the still-loaded container to another location. Other transporting scenarios are possible with such containers.

Containers may be stacked up and placed over grounds, yards, inside vessels, or in other areas. Each container may include a controller that controls various parameters associated with the container, including those associated with a refrigeration unit on the container in some examples. In some examples, from loading to unloading, the container should maintain the required parameters, such as temperature or percentage of gases ($CO_2$, $O_2$, etc.) in some examples. Trained service personnel may access the controller periodically to assess the health and status of the container.

SUMMARY

A system, according to an example of the present disclosure, includes a plurality of containers and a plurality of controllers. Each of the controllers are associated with a respective one of the plurality of containers. An unmanned aerial vehicle is configured for wireless communication with the plurality of controllers.

In a further example according to the foregoing example, the unmanned aerial vehicle is configured to perform a firmware upgrade on the plurality of controllers.

In a further example according to any of the foregoing examples, the unmanned aerial vehicle is configured to read temperatures from the plurality of controllers associated with the respective plurality of containers.

In a further example according to any of the foregoing examples, the unmanned aerial vehicle is controllable from a remote location and includes a device.

In a further example according to any of the foregoing examples, the unmanned aerial vehicle is configured to communicate data from the plurality of controllers to the device.

In a further example according to any of the foregoing examples, the system includes a plurality of refrigerant circuits. Each of the refrigerant circuits are associated with a respective one of the containers. Each of the refrigerant circuits is controllable by the controller on the respective container. The unmanned aerial vehicle is configured to monitor the health of the plurality of refrigerant circuits through communication with the plurality of controllers.

In a further example according to any of the foregoing examples, the unmanned aerial vehicle includes an image capture unit configured to take at least one of photo and video of the plurality of containers.

In a further example according to any of the foregoing examples, the unmanned aerial vehicle includes a microphone that is configured to conduct a noise check on the plurality of containers.

A method of communication between a container and an unmanned aerial vehicle according to an example of the present disclosure includes flying the unmanned aerial vehicle to a location of the container, initiating wireless communication between the container and the unmanned aerial vehicle, and exchanging data between the container and the unmanned aerial vehicle through the wireless communication.

In a further example according to any of the foregoing examples, the method includes exchanging data includes sending control information from the unmanned aerial vehicle to a controller on the container.

In a further example according to any of the foregoing examples, the method includes exchanging data includes receiving information associated with the container from a controller on the container.

In a further example according to any of the foregoing examples, the method includes exchanging data includes a firmware upgrade to a controller of the container.

In a further example according to any of the foregoing examples, the method includes exchanging data is associated with a refrigeration unit of the container.

In a further example according to any of the foregoing examples, the method includes exchanging data includes performing a health check of the refrigeration unit.

In a further example according to any of the foregoing examples, the method includes exchanging data includes receiving return air and delivery air temperatures of the refrigeration unit.

In a further example according to any of the foregoing examples, before the initiating step, the container is authenticated.

In a further example according to any of the foregoing examples, data associated with the exchanging is communicated from the unmanned aerial vehicle to a platform.

In a further example according to any of the foregoing examples, the unmanned aerial vehicle is controlled from a remote location distanced from the container.

In a further example according to any of the foregoing examples, the unmanned aerial vehicle includes a microphone, and the method includes performing a noise check on the container with the microphone.

These and other features may be best understood from the following specification and drawings, the following of which is a brief description.

DETAILED DESCRIPTION

Figure 1:
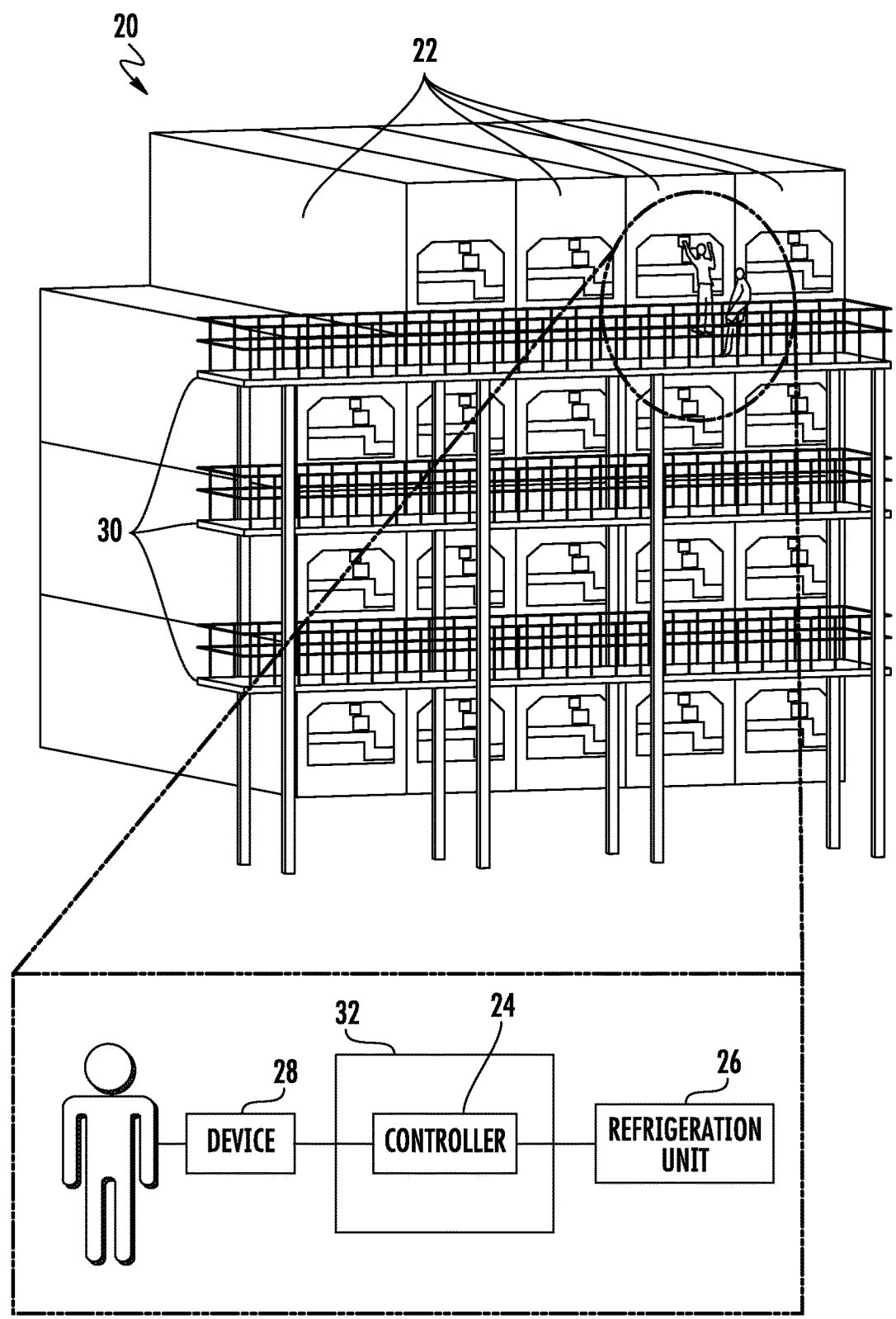
FIG. 1 schematically illustrates a prior art system for communicating with containers.

FIG. 1 schematically illustrates a prior art system 20 for communicating with a number of containers 22. The illustrated example containers 22 are intermodal containers that can be loaded and transferred among different carriers during a transportation cycle. Other types of containers may be used. Each of the containers 22 includes a controller 24, which may be accessed through an access opening 32 at the side of the container 22. The controller 24 may control various parameters of the container 22, including control of a refrigeration unit 26 of the container 22 in some examples.

The example refrigeration unit 26 provides refrigeration or temperature control for at least a portion of the interior of the container 22.

A worker may use one or more handheld devices 28 to communicate with the controller 24 to perform various monitoring or maintenance functions. Because several containers 22 may be stacked on top of one another, a ladder 30 may be provided adjacent the ends of the containers 22 such that the worker can access the controllers 24 of the multiple containers 22 through their access openings 32.

Figure 2:
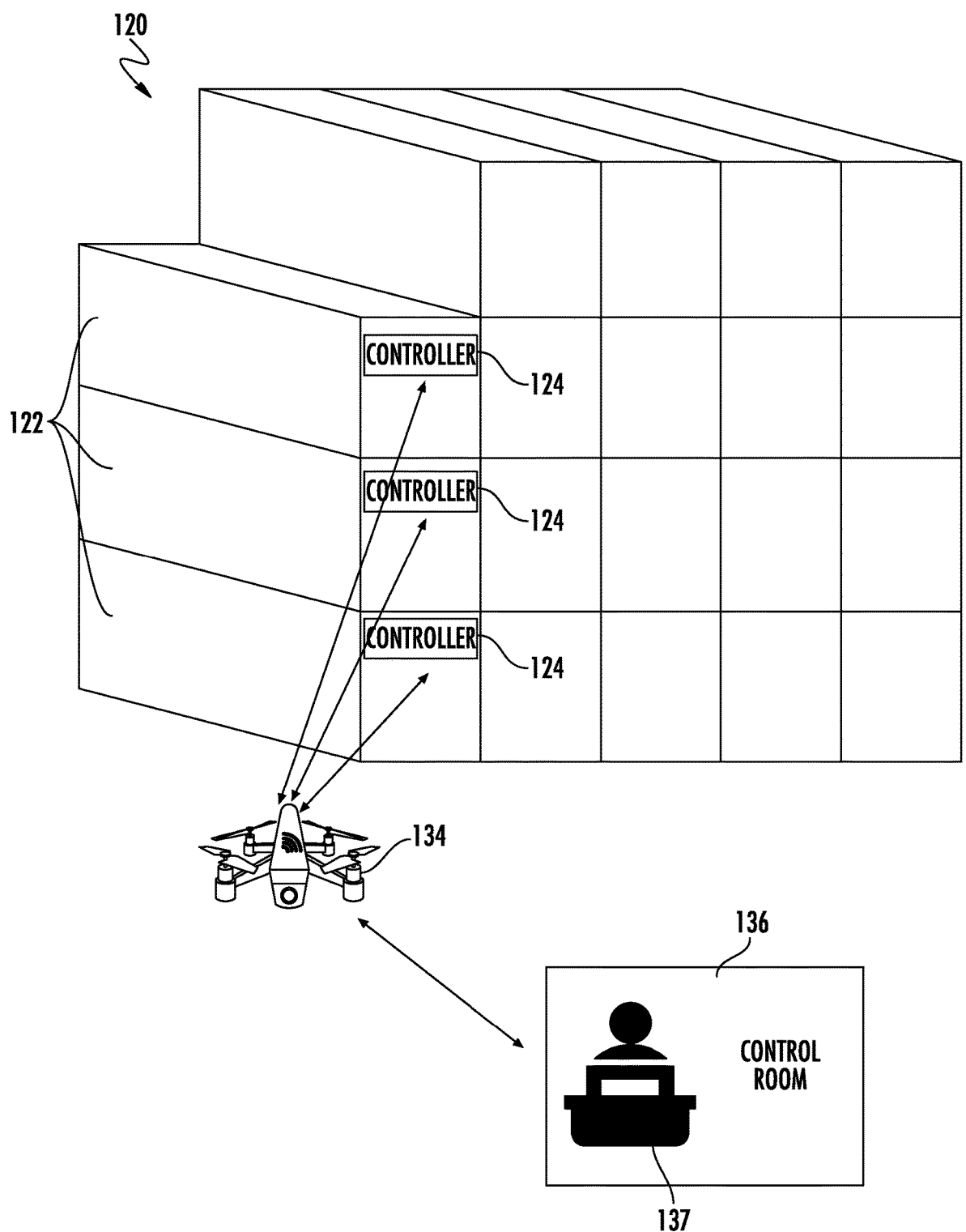
FIG. 2 schematically illustrates a system for communicating with containers using an unmanned aerial vehicle.

FIG. 2 schematically illustrates a system 120 including containers 122. It should be understood that like reference numerals identify corresponding or similar elements throughout the several drawings. Each container 122 has an associated controller 124.

An unmanned aerial vehicle (UAV) 134 is able to fly to locations near the controllers 124 and wirelessly communicate with the controllers 124. The UAV 134 may be any aircraft without a human pilot aboard. In some examples, the UAV 134 is a commercial mobility UAV capable of carrying various embedded devices (e.g., image capture unit, communicating devices, microphone). In some examples, the UAV 134 is a low altitude UAV. In some examples, the UAV 134 is capable of carrying a pay load of 10-15 kgs (22-33 lbs). The UAV 134 may be in wireless communication with another platform, such as a control station 136 in the illustrative example. In some examples, the UAV 134 may communicate data from the controllers 124 to the control station 136. The control station may include one or more computing devices 137, which may be configured to receive the data and/or control the UAV 134 in some examples.

As explained further below, the UAV 134 is controllable to exchange data with the containers 122 to perform any one or combination of monitoring, control, and/or maintenance functions for the containers 122, eliminating the need for workers to physically access the controllers 124 at the containers 122 and use ladders erected near the containers 122. In some examples, the UAV 134 is controllable remotely from the control station 136 by an operator located in the control station 136. The control station 136 may be located in a yard, in vessels or in a container sender and receiver office in some examples.

Figure 3:
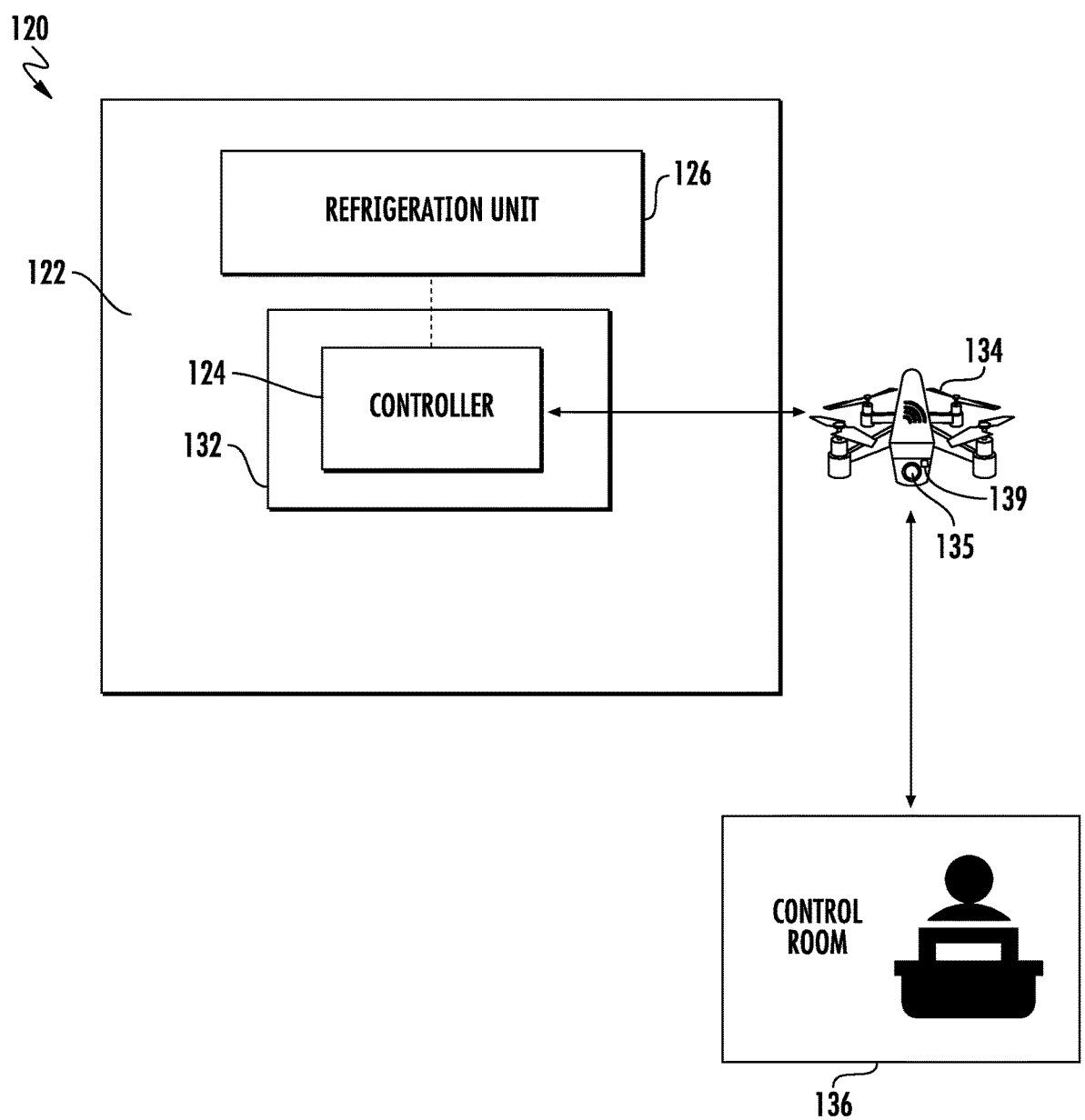
FIG. 3 schematically illustrates communication within the system of FIG. 2.

FIG. 3 schematically illustrates communication within the system 120 including a container 122 having a controller 124 accessible through an access opening 132 and in communication with a refrigeration unit 126 on the container 122. The UAV 134 communicates with the controller 124 wirelessly. In some examples, the wireless communication protocols may be Wi-Fi, Bluetooth, Li-Fi and/or ZigBee. The UAV 134 and containers 122 or controllers 124 may therefore be enabled with various wireless communication devices in some examples. Although one container 122 is shown for illustrative purposes, the UAV 134 may be capable of wireless communication with controllers 124 of multiple containers 122.

The UAV 134 communicates data from the controller 124 and/or other data associated with the container 122 to the control station 136, in some examples. Alternatively or additionally, the UAV 134 communicates data to other platforms, including Satellite, GSM, CDMA, or cloud-based platforms, in some examples.

In some examples of wireless communication between the UAV 134 and the controllers 124, the UAV 134 performs a firmware upgrade on one or more controllers 124. The UAV 134 may check the version of firmware on the controller 124 against the most current version, which would be preloaded on the UAV 134. If the firmware on the controller 124 is not current, the UAV would transfer the files to the controller 124 and run the upgrade. In some examples, the UAV verifies the respective controllers 124 with valid credentials before connecting.

As another example of wireless communication between the UAV 134 and the controllers 124, the UAV 134 may perform health checks of the containers 122. The health check verifies various system components and their proper functional operations.

As another example of wireless communication between the UAV 134 and the controllers 124, the UAV 134 may configure properties of the container 122. In some examples, the UAV may communicate with the controller to modify the temperature or other parameters (e.g., percentage of gases such as $CO_2$ or $O_2$; control modes, such as heating or cooling) of the refrigeration unit 126 within the container 122. An operator may therefore adjust parameters of the refrigeration unit by controlling the UAV 134 from a remote location, in some examples.

As another example of wireless communication between the UAV 134 and the controllers 124, the UAV 134 may read measurements associated with the container 122. In some examples, the UAV 134 may download from the controller one or more of return air temperature, supply air temperature, air flow, container pressure, etc., associated with the refrigeration unit. The UAV 134 may then send the data to the control station 136 for logging.

The UAV 134 may include an image capture unit 135 for capturing photographs and/or videos of the containers 122. In some example, the UAV 134 takes photographs and/or videos to ensure container 122 components are damage free, determine the position of the container, and/or to determine if there is an emergency, such as a fire or flooding. The photographs and/or videos may then be communicated back to the control station 136.

The UAV 134 may include a microphone 139 for performing noise checks associated with the refrigeration unit 126. In some examples, the UAV 134 records sounds, and noise levels are compared to threshold acceptable levels, such as at the control station 136 in some examples.

In some examples, the UAV 134 and the containers 122 may utilize geotagging with a global positioning system (GPS), such that a geographical location of a container 122 may be logged. In some examples, the geographical locations may be communicated to service personnel to achieve immediate maintenance and repair when needed. In some examples, the GPS may help in identifying incorrect position of a container 122. In some examples, the UAV 134 may pin the locations of the multiple containers 122 in an offline pinned map of the layout of the containers, and communicate that data to other locations or platforms, such as to somewhere it can be used by service personnel.

Figure 4:
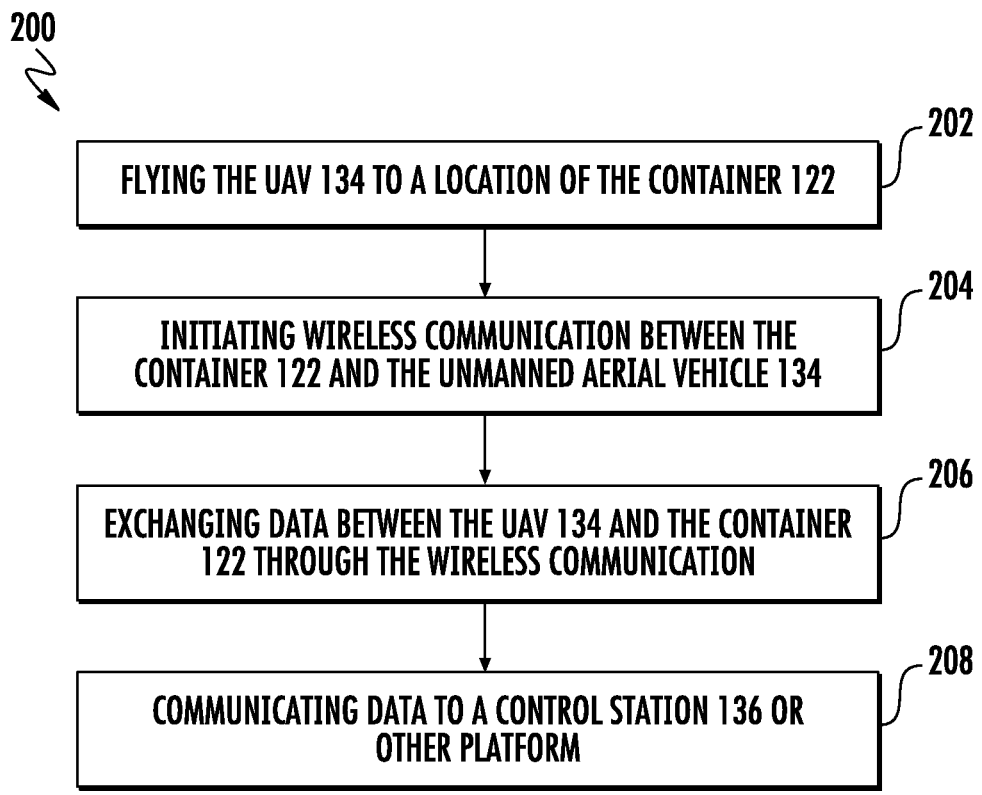
FIG. 4 schematically illustrates a method of communication between a container and an unmanned aerial vehicle.

FIG. 4 illustrates a flowchart of a method 200 that may be used, in some examples, with the example system 120 disclosed in FIGS. 2 and 3. The method 200 of communication between a container 122 and a UAV 134 may include, at 202, flying the UAV 134 to a location of the container 122. At 204, the method 200 may include initiating wireless communication between the container 122 and the unmanned aerial vehicle 134.

At 206, the method 200 may include exchanging data between the UAV 134 and the container 122 through the wireless communication. In some examples, the exchanging data includes sending control information from the UAV 134 to a controller 124 on the container 122. In some examples, the exchanging data includes receiving information associated with the container 122 from a controller 124 on the container 122.

At 208, the method may include communicating data to a control station 136 or other platform. In some examples, the UAV 134 may initiate from a location and return to that location after performing step 206 and/or 208 for one or more containers 122.

In some examples, the data exchanging step 206 includes performing a health check of the container 122. In some examples, a monitoring activity includes downloading data associated with the container 122. In some examples, the data exchanging step 206 includes reading return air and delivery air temperatures of the refrigeration unit 126. In some examples, the data exchanging step 206 includes a conducting a firmware upgrade. In some examples, the data exchanging step 206 includes adjusting parameters of a refrigeration unit located in the container 122. In some examples, the data exchanging step 206 is associated with a refrigeration unit 126 of the container 122. In some examples, the data may be associated with the data exchanging step 206.

In some examples, the UAV 134 may authenticate the container 122 before establishing wireless communication. Examples of authentication include providing access credentials for performing the required functional operations.

In some examples the UAV may be an autonomous UAV that may perform scheduled functions and report generation.

The system 120 and method 200, as compared with prior art systems and methods, save preloading and maintenance time, improve quality of maintenance, require less physical presence at the containers 122, increase safety, and reduce manual error.

Although the different embodiments are illustrated as having specific components, the embodiments of this disclosure are not limited to those particular combinations. It is possible to use some of the components or features from any of the embodiments in combination with features or components from any of the other embodiments.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A system comprising:
a plurality of intermodal shipping containers;
a plurality of controllers, each of the controllers being associated with, and configured to control a parameter of, a respective one of the plurality of containers;
an unmanned aerial vehicle configured for wireless communication with the plurality of controllers; and
a refrigeration unit in each of the plurality of containers, wherein each of the plurality of containers includes an access opening for accessing the respective controller, and each of the plurality of controllers is configured to provide refrigeration or temperature control of the refrigeration unit for at least a portion of an interior of the respective container.

2. The system as recited in claim 1, wherein the unmanned aerial vehicle is configured to perform a firmware upgrade on the plurality of controllers.

3. The system as recited in claim 1, wherein the unmanned aerial vehicle is configured to read temperatures from the plurality of controllers associated with the respective plurality of containers.

4. The system as recited in claim 1, wherein the unmanned aerial vehicle is controllable from a remote location including a device.

5. The system as recited in claim 4, wherein the unmanned aerial vehicle is configured to communicate data from the plurality of controllers to the device.

6. The system as recited in claim 1, comprising:
a plurality of refrigerant circuits, each of the refrigerant circuits being associated with a respective one of the containers, each of the refrigerant circuits being controllable by the controller on the respective container, wherein the unmanned aerial vehicle is configured to monitor the health of the plurality of refrigerant circuits through communication with the plurality of controllers.

7. The system as recited in claim 1, wherein the unmanned aerial vehicle includes an image capture unit configured to take at least one of photo and video of the plurality of containers.

8. The system as recited in claim 1, wherein the unmanned aerial vehicle includes a microphone configured to conduct a noise check on the plurality of containers.

9. A method of communication between an intermodal shipping container and an unmanned aerial vehicle, the method comprising:
flying the unmanned aerial vehicle to a location of the container;
initiating wireless communication between the container and the unmanned aerial vehicle; and
exchanging data between the container and the unmanned aerial vehicle through the wireless communication, including sending control information from the unmanned aerial vehicle to a controller on the container, wherein the exchanging data includes receiving information associated with the container from a controller on the container, and the control information includes refrigeration or temperature control of a refrigeration unit for at least a portion of an interior of the container.

10. The method as recited in claim 9, wherein the exchanging data includes a firmware upgrade to a controller of the container.

11. The method as recited in claim 9, wherein the exchanging data is associated with a refrigeration unit of the container.

12. The method as recited in claim 11, wherein the exchanging data includes performing a health check of the refrigeration unit.

13. The method as recited in claim 11, wherein the exchanging data includes receiving return air and delivery air temperatures of the refrigeration unit.

14. The method as recited in claim 9, the method comprising:
before the initiating step, authenticating the container.

15. The method as recited in claim 9, the method comprising:
communicating data associated with the exchanging from the unmanned aerial vehicle to a platform.

16. The method as recited in claim 9, the method comprising:
controlling the unmanned aerial vehicle from a remote location distanced from the container.

17. The method as recited in claim 9, wherein the unmanned aerial vehicle includes a microphone, the method comprising performing a noise check on the container with the microphone.

* * * * *